US005681644A

United States Patent [19]

Dressler

[11] Patent Number: 5,681,644

[45] Date of Patent: Oct. 28, 1997

[54] INK TRANSFER WITH HOT PEEL CARRIER

[75] Inventor: Donald R. Dressler, Glastonbury, Conn.

[73] Assignee: Transfer Express, Inc., Mentor, Ohio

[21] Appl. No.: 671,599

[22] Filed: Jun. 28, 1996

Related U.S. Application Data

[63] Continuation of Ser. No. 243,154, May 16, 1994.

[51] Int. Cl.[6] .......... B32B 3/00

[52] U.S. Cl. .......... 428/195; 428/207; 428/331; 428/343; 428/355 N; 428/411.1; 428/483; 428/488.4

[58] Field of Search .......... 428/913, 914, 428/411.1, 204, 488.4, 195, 207, 331, 343, 355 N, 483

[56] References Cited

U.S. PATENT DOCUMENTS

| | | | |
|---|---|---|---|
| 4,275,104 | 6/1981 | De Nagybaczon | 428/195 |
| 4,308,310 | 12/1981 | Arnold et al. | 428/195 |
| 4,421,816 | 12/1983 | Arnold | 428/202 |
| 4,515,849 | 5/1985 | Keino et al. | 428/201 |
| 4,548,857 | 10/1985 | Galante | 428/200 |
| 4,657,803 | 4/1987 | Pernicano | 428/200 |
| 4,717,621 | 1/1988 | So et al. | 428/349 |
| 4,910,070 | 3/1990 | Al'Hariri | 428/181 |
| 5,073,423 | 12/1991 | Johnson et al. | 428/40 |

*Primary Examiner*—William Krynski
*Attorney, Agent, or Firm*—Chilton, Alix & Van Kirk

[57] ABSTRACT

The ink transfer decal comprises a carrier sheet having a dimensionally stable base and a coating on the base defining an upper surface of the carrier sheet. The upper surface has a non-tacky, smooth matte finish at ambient temperature. A film of dried thermoplastic ink having at least one color, is printed directly on and adheres to the upper surface of the carrier sheet to form a reverse image graphic. A deposit of thermoplastic adhesive covers the ink, thereby constituting an ink decal for transferring the reverse image graphic to a substrate.

9 Claims, 4 Drawing Sheets

INK TRANSFER WITH HOT PEEL CARRIER

This is a continuation of U.S. patent application Ser. No. 08/243,154, filed May 16, 1994, pending, entitled SCREEN PRINTED INK TRANSFER FOR NYLON.

BACKGROUND OF THE INVENTION

The present invention relates to so-called ink transfers, and more particularly, to a decal for transferring ink to nylon.

For many years nylon has been a popular material for the making of jackets, gym bags, windbreakers and similar articles where the qualities of durability, light weight, and water repellence are desired. Such jackets and bags often carry a team logo or other graphic, e.g., of a professional sports team or to indicate membership on a high school, college or recreational league team. Many of the desirable properties of nylon for the manufacture of the jacket or bag, present significant disadvantages as a substrate for receiving a permanently bonded graphic, particularly a multi-colored graphic. One of the few techniques which can successfully apply a graphic to nylon, is the direct printing, such as by screen printing, of solvent based catalyzed urethane ink systems, or a catalyzed plastisol ink. These techniques do not utilize a distinct adhesive layer apart from the ink itself. Even these techniques are not completely satisfactory when used on woven nylon, which has a very hard surface that are desirable for windbreakers and the like.

The direct printing of nylon substrates can be accomplished in a reasonably efficient manner, in a central facility which is set up with the screen printing equipment and trained operators, for the production of a large quantity or run of a particular graphic on particular jackets. For example, a college bookstore might order several hundred nylon jackets which carry no logo, and send them to a printer who will prepare an appropriate screen and print the college name and emblem on the left breast portion of the jacket. The college store keeps the jackets as returned from the printer, in inventory for point of sale to the students or other purchasers.

On the other hand, teams or other groups that have a need for only a relatively few, specially lettered jackets, experience many inconveniences when working with a central printing facility. For example, a baseball team having 25 players may order a "first run" of 25 jackets which have been purchased by the team members individually, but as the composition of the team changes from year-to-year the need arises for adding only a handful of new jackets each year. The unit cost for printing only a few jackets, as well as the effort in sending and waiting for the jackets to be printed, pose significant inconveniences.

One method for fabricating an ink transfer by screen printing, developed by the present inventor, includes the steps of supporting a mesh stencil having a porous image area, adjacent to a clear plastic carrier sheet, and then printing urethane ink through the porous image area to form a reverse image graphic on the target area of the carrier sheet. The ink is dried, and a urethane based adhesive is deposited substantially coextensively on the reverse image graphic, preferably by screen printing. Preferably, several ink colors are printed in a sequence of printing and drying steps, using a respective plurality of different stencils.

The associated method for transferring the ink of the decal to a fabric substrate, includes preheating the substrate, preferably woven nylon, to release entrained moisture. The adhesive side of the decal is placed onto the substrate, so that the graphic is right-reading as visible through the carrier sheet. Heat and pressure are applied through the carrier sheet whereby the adhesive bonds the graphic to the substrate. The carrier sheet is peeled away from the graphic, then the graphic is heat set into the substrate by placing a low friction, flexible pad, such as a textured silicone rubber sponge, over the graphic and again applying heat and pressure. The pad accommodates the effect of differential shrinkage between the graphic and the substrate due to the heat, particularly as occurs with nylon fabric.

In a high production environment, the total amount of time required by the operator to perform the foregoing steps should, of course, be minimized. One step in the foregoing method which is dictated by the materials, rather than the skill or efficiency of the operator, involves peeling the carrier sheet away from the graphic, after the graphic has initially adhered to the fabric. The carrier sheet must not be peeled away from the graphic, while the adhesion between the graphic and the carrier sheet, approximates or exceeds the adhesion between the graphic and the fabric. Particularly in the case of nylon fabric, the initial adhesion of the graphic to the fabric is somewhat tenuous; that is why the foregoing method includes the further step of heat setting the graphic to the substrate. In practice, the decal is permitted to cool somewhat before the carrier is peeled away from the graphic. By decreasing the time required for the operator to wait for the decal to cool, greater productivity can be achieved in a high production environment.

SUMMARY OF THE INVENTION

It is a general object of the present invention to provide a screen print system and method which avoids the need to send jackets, bags or the like, to a central printing facility. Rather, the team is furnished with a supply of decals by which high quality, multicolor graphics can be attached to the garments, as the need arises, by the local use of a relatively inexpensive and commonly available heat press.

It is a more particular object of the present invention, to provide an ink transfer decal which can quickly and efficiently be bonded to a nylon substrate, especially in a high production environment.

Accordingly, the present invention provides an ink transfer decal by which a thermoplastic graphic can more efficiently be bonded to a nylon or other fabric substrate, with the application of modest heat and pressure.

The ink transfer decal according to the invention, comprises a carrier sheet having a dimensionally stable base and a coating on the base defining an upper surface of the carrier sheet. The upper surface has a non-tacky, smooth matte finish at ambient temperature. A film of dried thermoplastic ink having at least one color, is printed directly on and adheres to the upper surface of the carrier sheet to form a reverse image graphic. A deposit of thermoplastic adhesive covers the ink, thereby constituting an ink decal for transferring the reverse image graphic to a substrate.

The coating preferably comprises an acrylic copolymer crosslinked with a polymeric diphenol methane diisocyanate, and silica particulates. The particulates contribute to the smooth matte surface property, which is easily wetted out by water based inks. As a result, the inks when dry, exhibit a high degree of adhesion to the coating surface.

Another significant characteristic of the coating, permits the carrier to be peeled away from the graphic, even when the graphic has been adhered with only tenuous strength, to a substrate such as a nylon fabric. The strength of the adhesion between the coating and the graphic diminishes at elevated temperatures, i.e., when the decal is in the temperature range typically associated with a conventional heat press for heat applied graphics. This assures that the carrier can easily be peeled from the graphic, even while the graphic is adhered to hot nylon.

Those skilled in the field of screen printing will readily appreciate the advantages of the present invention. For the first time, a decal transfer of graphics onto woven nylon, can have the same level of graphics definition, color, adhesion and durability, as was previously available only from the direct screen printing onto the nylon garment. End users of the decals can maintain an inventory of decals for easy transfer to virtually any garment or substrate on which a logo or the like is desired, without the need to send the substrate to a central printing facility. When utilized at a central facility, the invention improves the efficiency and effectiveness of the work throughout.

Those familiar with the field of graphics as used in the printing industry, can appreciate that some of the improvements described and claimed herein, are not limited to the manufacturer of screen printed decals, but may find applicability in the direct screen printing of fabrics and other substrates.

BRIEF DESCRIPTION OF THE DRAWINGS

These and other objects and advantages of the invention will be more fully described below, with reference to the accompanying drawings, in which.

DESCRIPTION OF THE PREFERRED EMBODIMENT

Figure 1:
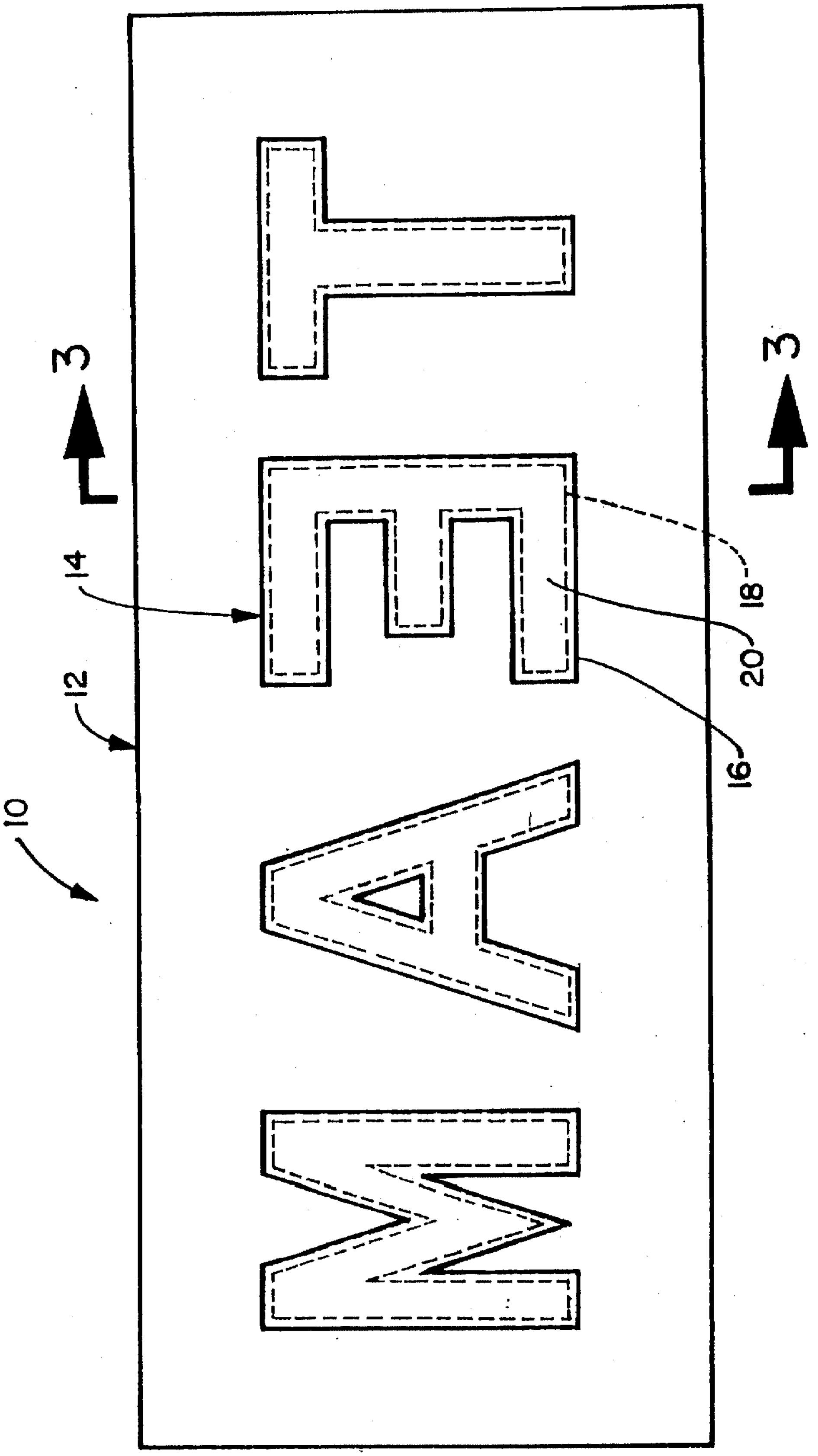
FIG. 1 is a plan view of a decal in accordance with the present invention.
Figure 2:
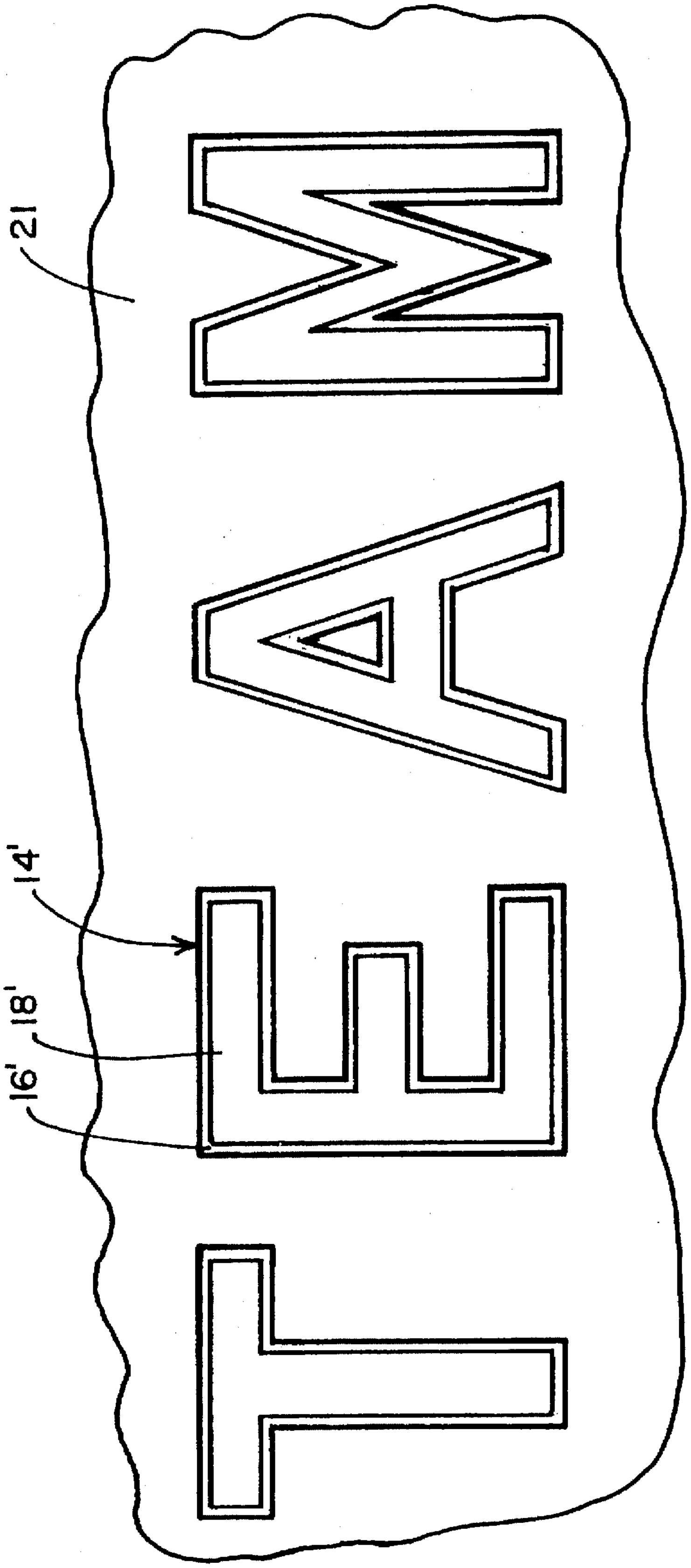
FIG. 2 is a schematic representation of the graphic portion of the decal, after transfer to a garment or similar substrate.
Figure 3:
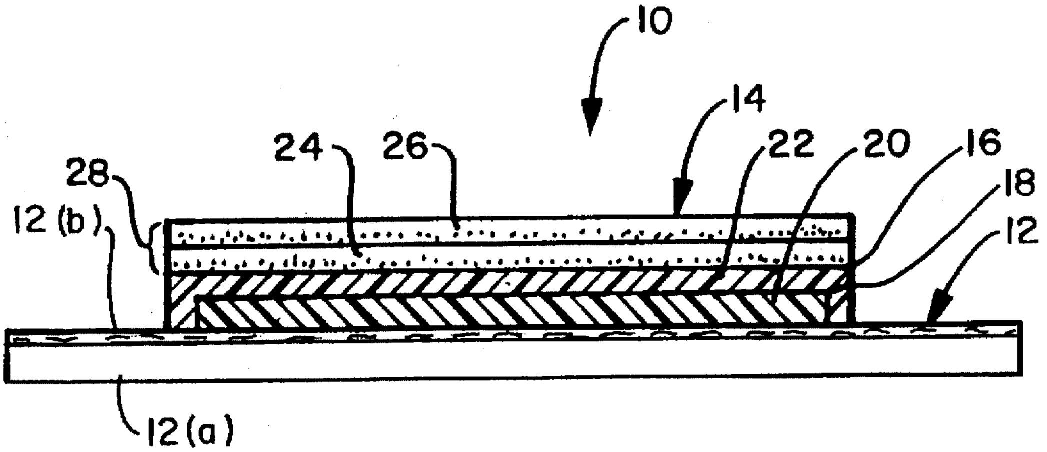
FIG. 3 is cross-sectional view of one graphic character of a decal, taken along line 3—3 of FIG. 1.

FIGS. 1 and 3 show an ink transfer decal 10 in accordance with the present invention. The decal comprises a dimensionally stable carrier sheet 12 which preferably includes a plastic material base 12*a*, the most desirable being a clear polyester film, and a coating 12*b* thereon. A printed pattern is carried by sheet 12, as a continuous pattern or a series of disconnected pattern components such as shown at 14. The particular pattern shown in FIG. 1, spells out the word "TEAM", in reverse image. Each component such as 14, has a visible outline 16 and a hidden outline 18 shown in phantom thereunder. It can be appreciated that when the transfer of FIG. 1 is bonded to a substrate 21 as shown in FIG. 2, the portion of the graphic 14' having outline 16' will be a background color, and the hidden outline 18 of FIG. 1, will appear as the border 18' of a different, foreground color superimposed on the background color.

In FIG. 1, the outline 16 is the boundary not only of the background color, but also the adhesive by which the graphics 14 will be bonded to the substrate 21 of FIG. 2.

FIG. 3 is a section view along lines 3—3 of FIG. 1, showing the superimposition of the inks and adhesives of the finished decal 10. The base 12*a* of the carrier 12, is preferably a clear polyester film, having a thickness of about 4 mils, on which coating 12*b* has been applied. The material of coating 12*b*, has the unique property in the present context, of exhibiting a high degree of adhesion at ambient temperature, with a transition to a very low degree of adhesion at elevated temperature.

The coating also has the property of easily being wetted out by water based inks, thereby permitting the printing of reverse image graphic patterns thereon, which dry in the form of dense films that strongly adhere to the surface of the coating at ambient temperature. However, at a temperature between about 250°–350° F., the upper surface "disadheres" from the film of dried ink.

Thus, the novel functional aspect of the upper surface of the carrier, as provided by the coating, is the combination of a smooth matte surface which is easily wetted out by water based inks, and what can be characterized as a negative temperature coefficient of adhesion to such inks after drying, whereby adhesion is high at ambient temperature, but diminishes with increasing temperature.

One such coating comprises an acrylic copolymer cross linked with polymeric diphenol methane diisocyanate, in which silica particulates are distributed. Preferably, the silica particulates in the coating, have a maximum concentration at the upper surface, e.g., resulting from the natural concentration thereon during drying of the coating. The coating can be applied to the base by any conventional technique, such as knife-over-roll, reverse roll, or screen printing, in sheet format.

One particular coating known to be effective, is formulated from a solvent-based solution of acrylic copolymer in ethyl acetate and hexane, such as is available from the Monsanto Company of St. Louis, Mo., as GELVA 1151. This solution is modified by cross-linking with a polymeric diphenol methane diisocyanate (MDI), such as is available from Dow Chemical, Midland, Mich. as PAPI-27. The polymeric MDI content is in the range of 1–3%, preferably 3%, of the solids content in the acrylic copolymer. The silica particulates are added to the cross-linked material. Suitable particulates are available from the W. R. Grace & Co. of Baltimore, Md, as SYLOID-234. The particulates serve as a flatting agent to control gloss and thereby provide a non-tacky surface on the dried coating. Such a surface affords anchorage for the printing of inks thereon. Furthermore, as noted above, the surface is easily wetted out by water-based inks, due at least in part to the coating absorbing moisture from the inks, which as is known in the art, facilitates high quality printing.

The material as formulated above is coated onto the base 12*a*, such that the material will have a suitable dry thickness.

The carrier can be translucent, e.g., permitting sufficient transmission of light so that the pattern 14 thereon can be discerned while viewed from the underside of the carrier. This is not absolutely necessary, however, in that a coated paper or a combination of plastic and paper composite could be utilized, even if opaque, although this is not preferred. It is important that the base of the carrier sheet 12 have dimensional stability upon exposure to the typical drying temperatures and durations associated with ink screen printing, and the temperatures and pressures utilized in typical heat presses of a type to be described more fully below. It is believed that the greater amount of plastic in the base 12*a* of the carrier sheet, the greater the stability. A polyester film having a thickness in the range of 3–10 mils is considered ideal for this purpose.

A first deposit 20 of dried, urethane-based ink having a first color, is printed on the carrier sheet in the pattern such as shown within the phantom lines 18 of FIG. 1. A second deposit 22 of dried, urethane-based ink having a different, second color, is printed as a different second pattern on the first pattern and the carrier sheet. This second pattern may have the same overall shape but a larger size, such as shown by the outline 16 in FIG. 1. In a two-colored decal, only the portion of the second color which is in contact with the carrier sheet 12, will be visible in the final graphic, as shown at 16' in FIG. 2. Subsequent printing of additional colors, each being in contact with at least a portion of the carrier sheet, can similarly be stacked one on top the other, but in FIG. 3, only two ink patterns 20,22 are shown. It can be appreciated that a given printed color pattern need not be related in shape to a previously printed pattern, e.g., the last, background pattern could be a rectangle, circle, or other geometric shape such that the first and any previously printed patterns, define an alpha-numeric graphic printed in reverse image on the background color. The dry ink deposits are highly consolidated and are substantially equivalent in thickness and density, to thermoplastic film. Such deposit would typically have a thickness of at least about 0.5 mil (corresponding to the printing of one color), and would be thicker than at least about 1 mil on those regions that have been over printed with more than one color.

A deposit of dried, urethane-based adhesive 24 has been printed on the second pattern 22. These are the minimum constituents for a two-color ink decal for transferring a reverse image composite of the first and second patterns, to a substrate such as 21 shown in FIG. 2. The adhesive can be a two-layered system 28, constituted by contiguous layers 24,26. Importantly, the adhesive system 28 covers all of the last-applied ink pattern such as 22, without contacting the carrier sheet 12. In other words, the outline of the adhesive pattern 28 and the outline of the last-applied colored pattern 22, are coextensive as shown at 16 in FIG. 1. This congruity is achievable by printing the adhesive system 28 onto the last color pattern 22, using the same or an identical stencil, as will be described in greater detail below.

In the finished decal 10 as shown in FIGS. 1 and 3, each dried ink pattern 20,22, and each adhesive layer 24,26 is preferably about 0.5–1.5 mil in thickness. Urethane-based inks are preferred for use on fabrics which may experience considerable flexure and abrasion, such as athletic wear, gym bags, and the like. Preferably, the urethane is water-based, because this presents less restrictive environmental discharge and handling concerns, but solvent based urethanes could also be used.

An example of the preferred urethane ink would be prepared as follows. A first water-based urethane dispersion containing essentially about 30–50 wt. % (preferably 40%) solids of submicron size, 3–10% co-solvent, and the balance (40–60 wt. %) water, is selected. A suitable dispersion is available from Stahl U.S.A. (of Peabody, Mass.) as dispersion No. UE-40512. A second, water-based pigment dispersion is then selected, having for example essentially 25–35 wt. % solids (of which at least three-fourths is pigment) with the balance being water and propylene glycol (e.g., in a water-to-glycol ratio of about 4 to 1). An example for the color red, is available from the Daniel Products Company (of Jersey City, N.J.) as dispersion No. WD-2625. The urethane dispersion and the pigment dispersion are mixed and a thickener is added to achieve a viscosity above about 5,000 centipoise. A suitable thickener is available from BASF (of Parsippany, N.J.) under the brand Collacrol VL. A defoamer may also be added, such as is available from the Ultra Corporation (of Patterson, N.J.) as DEFO-806102, to constitute only about 1% of the total weight of the ink.

Those familiar with inks for screen printing and the like can, from the foregoing description of the preparation of one red-colored ink, readily prepare any number of suitable urethane based colored inks for implementing the present invention.

It should be appreciated that the urethane inks of the type described immediately above are preferably aliphatic, and therefore have the desirable property of resistance to yellowing with age and exposure to ultra violet light. Also, no catalyst is necessary for activation upon the application of heat during transfer of the ink to the fabric, as will be described below.

In the two-component adhesive system 28 as shown in FIG. 3, the exposed adhesive layer 26 is preferably a water-based non-aliphatic urethane available as Sancor 12758, from the Sancor Company, Leominster, Mass. The contiguous, hidden adhesive layer 24, is a different water-based urethane adhesive formulation, preferably a mixture of approximately equal parts of Sancor 12758 with Sancor 2104. With the commercial heat presses by which the decal will be attached to the fabric as described below, the constituent layers of the adhesive system 28 should have a softening point of approximately 200° F. The dual layer adhesive system is particularly effective for attachment of ink graphics to nylon, in that the top layer 26 heat sets strongly into the nylon, whereas the under layer 24 strongly bonds to the ink graphic, and the two adhesive layers 24,26 bond strongly to each other.

Other adhesive systems might also be usable, such as for example, a combination of a water-based and solvent-based adhesive system or an adhesive system having only a single layer. For example, a cost effective decal can be made by omitting layer 26.

Figure 4:
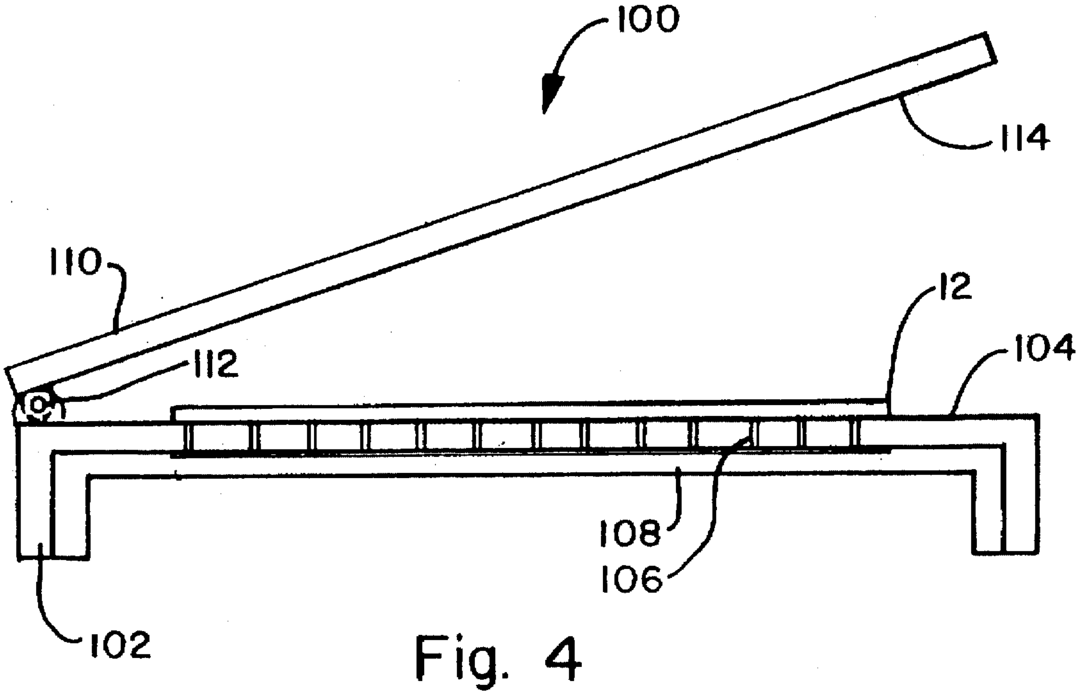
FIG. 4 is a schematic representation of a screen printing station during the method of fabricating the decal shown in FIG. 1.
Figure 5:
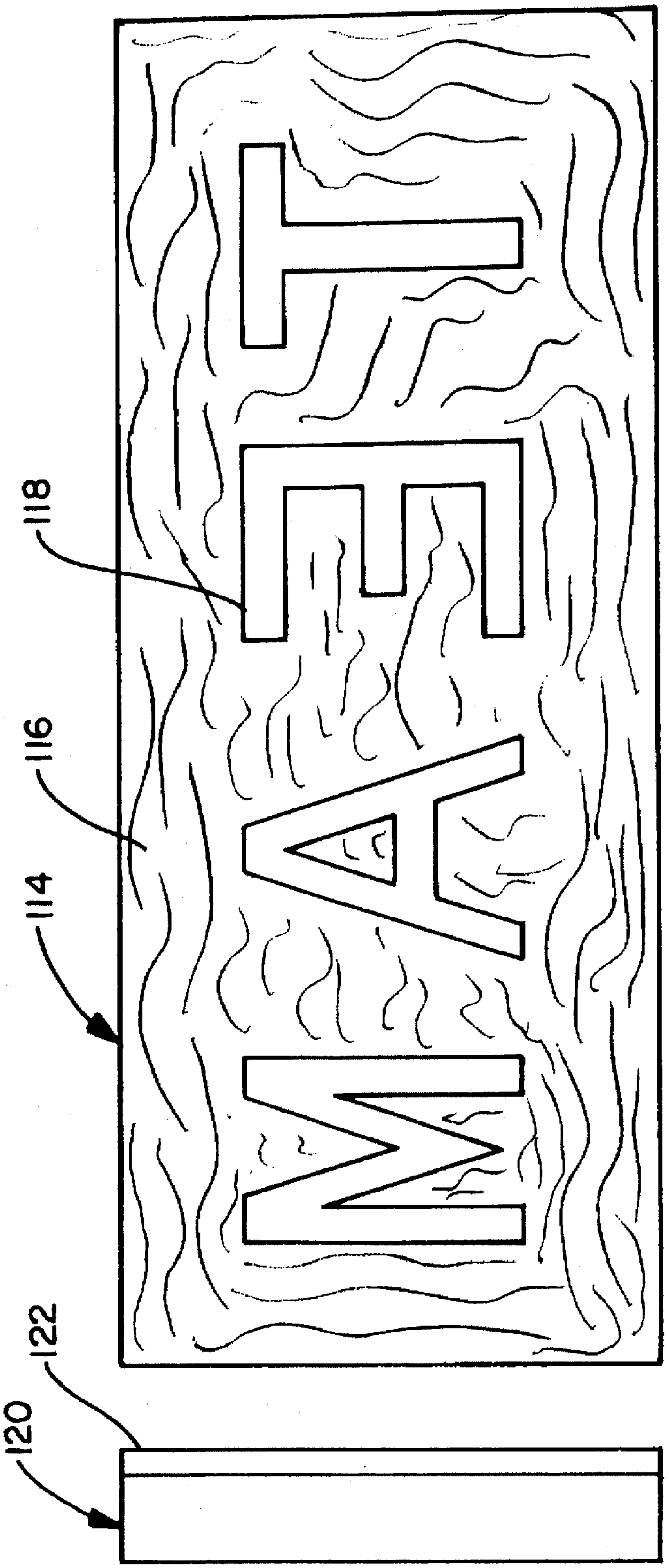
FIG. 5 is a plan view representation of the stencil carried by the screen printing frame, during the process of fabricating the decal shown in FIG. 1.

Turning now to FIGS. 4 and 5, the method for fabricating the decal of FIG. 1 will be described in detail with respect to a simple, manually operated screen printing station. FIG. 4 shows such a screen print station 100 having a base section 102 defining a flat horizontal table 104. The table 104 includes a plurality of channels 106 which lead into a plenum 108 that is maintained at pressure lower than ambient. A carrier sheet 12, when positioned on the table 104, is held in place by the "sucking" action of the channels 106. A frame 110 is pivotally mounted at 112 to the base 102 for movement toward and away from the table 104. The lower side of frame 110 supports a stretched mesh 114 which has a stencil formed therein according to well-known screen print techniques.

FIG. 5 is an example of one screen mesh 114, wherein the border region 116 is impervious to the passage of ink, whereas the clear image areas 118 are porous to ink. The clear image area 118 shown in FIG. 5 corresponds to the first color region or pattern 20 shown in FIGS. 1 and 3. It should be appreciated that a pattern 22 of the second color, could later be attached to frame 110 in place of the removable, earlier used mesh 114 shown in FIG. 5, or the entire frame 110 could be replaced with a new frame having the different stencil. The stencil for applying adhesive layers 24,26 could be the same as the stencil for printing pattern 22, or a different mesh could be used in sequence.

When the frame is pivoted from the open position shown in FIG. 4 to a closed position, the stencil lies above the carrier sheet 12, such that the clear image area of the stencil lies flat immediately above the target area on carrier sheet 12. In a manner well known to screen printers, a quantity of ink is placed at one end of the mesh 114 (FIG. 5) and drawn with a squeegee 120 across the mesh such that the ink is forced (i.e., extruded at ambient temperature) through the clear image area onto the carrier sheet 12, but no ink passes through the impervious border region 116. The ink therefore forms a reverse image graphic on the carrier sheet, similar to the clear image area on the mesh 114. In the simplest embodiment of the invention, a single ink color is printed, then the carrier with ink is dried in a conventional manner, whereupon the carrier is repositioned exactly on the table. Using a similar screen printing procedure, a urethane based adhesive is printed on the reverse image graphic, but not on the carrier sheet.

Alternatively, a single carrier sheet can have differently colored inks printed in unconnected, distinct target areas, without overlapping the previously printed ink. Moreover, on a given carrier sheet some target areas may have overlapping printed areas, whereas in other target areas on the carrier sheet, distinct, single color graphics may be printed.

Generally, the preferred adhesive formulation system is colorless, so that even if the adhesive is printed on the upper ink layer slightly beyond the border of the ink, there will be no deleterious effect on the garment. Providing a slightly oversized adhesive print pattern does, however, improve production efficiency because tolerances on registering the carrier sheet and/or stencil for each printing of the adhesive, can be relaxed, without concern that the edges of the ink patterns will not be covered by adhesive.

Although the adhesive could be colored, this is not preferred. Maintenance of flexibility in the fabric is desirable, particularly if the fabric is to worn as a garment. Therefore, any adhesive that sets into the fabric should not include stiffening agents such as pigmentation. Pigmentation in the ink, however, does not present the same stiffening problems because the ink is not as close to the user's body and it is raised above the fabric, rather than intermingled in the weave thereof. A total thickness of at least 1.5 mil in the adhesive system 28 (FIG. 3) helps keep the ink graphic above the fabric even after attachment.

One other noteworthy aspect of the preferred method, is the use of a squeegee 120 having a hard, sharp, rigid active edge 122. As shown in FIG. 5, the stencil 114 typically is considerably thicker in the border areas 116, where the mesh has been treated to fill the mesh openings, thereby rendering the border non-porous. The untreated mesh 118 is relatively porous, and thinner. With the preferred squeegee 120, shown in FIGS. 6 and 7, the active edge 122 contacts and moves along the thickened border regions 116, while bridging the intervening, porous region 118. Because the active edge of the squeegee does not deform, it remains a distance above the substrate 12 to be printed, substantially equal to the thickness of the border areas. This differs from conventional squeegee formats, wherein the active edge is softer and therefore deforms to the extent of contacting the porous mesh and even scooping ink out from the openings in the mesh. With the present invention, a considerably thicker ink layer can be printed through the porous area. Preferably, the active edge 122 is the corner of hard plastic such as Delrin, which has a hardness exceeding about 90 on the ASTM D-785 scale, but the plate or edge can be made of metal. As a result, ink and adhesive layers can be printed to wet thicknesses exceeding 2 mils. The upper portion of the plate can optionally be partially covered by a softer handle substantially squared-off end of a plate 124 of 126.

Those skilled in the this field will appreciate that the simple, fully manual screen printing station shown in FIG. 4, can be upgraded to a variety of automatic and semi-automatic high production systems. For example, semi-automatic or automatic techniques are available with a moving web on which the carrier sheet is automatically moved from process step to process step. In such systems, the printing itself, i.e., the movement of a squeegee or the like for extruding ink through the stencil, can be either manual or automated. Fully automated techniques can include a moving web which transports the carrier sheet between a rotating cylinder and a squeegee held at an oblique angle to the web. It is possible to print a particular color through a particular stencil multiple times on respective multiple carrier sheets, dry all the sheets, and then print all the sheets again using a second stencil and a second color, etc. Alternatively, in a highly automated line, a particular target area on a carrier sheet is printed with a first color, dried, then printed and dried at a different location downstream of the first printing and drying operation, etc.

The carrier sheet could be in the form of a polyester film roll which is printed as desired to form a multiplicity of connected decals, which are then cut and stacked for shipping. Alternatively, the carrier sheets are in the form of discrete, typically rectangular pieces each of which is printed step by step to complete the decal. Techniques are well known for registering the carrier sheet for each printing operation, and therefore this forms no part of the present invention. Similarly, the drying techniques between printing steps, are not limited to oven drying, but could include flash curing. Flash curing may be particularly well suited to implementing the method of the present invention on a carousel type printing system where each step is performed following discrete incremental movements of the carousel such that the finished decal is eventually taken off the carousel near where its carrier sheet was placed on the carousel.

It should be understood, therefore, that although a typical hand drawn squeegee having the improved active edge, has been shown in FIG. 5 for use in a manual system of the type shown in FIG. 4, those skilled in the art can adapt the inventive concept to a more automated system. The squeegee active edge should not bend or deform in the direction transverse to the rotation axis of the roller, i.e., so as not to deform into the openings in the weave of the mesh or equivalent.

It should be appreciated that the adhesive material need not have the same viscosity or flow characteristics as the ink. The adhesive is preferably not visible in the final stage shown in FIG. 2 after the decal has been applied to the garment, so that the surface, texture and similar properties of appearance that are important for the visible color patterns, are not important for the adhesive. The significant variables (other than the formulation) that determine the print quality of the ink, include the thickness of the mesh, the distance of the mesh from the carrier sheet during printing, the gauge of the mesh, the tightness of the mesh, and the squeegee format (e.g., hardness and contour). These variables can be adjusted empirically to achieve optimal results.

Once a decal of the type shown in FIG. 1 has been made, it can be readily handled and shipped to an end user, who can store the decal for a considerable period of time until needed, e.g., until a new player joins the team and a new jacket is purchased and the logo is to be applied. The only equipment needed for applying the transfer is a conventional heat press such as the Hotronix T-Shirt heat sealing press available from Stahls', Inc. of St. Clair Shores, Mich. On the assumption that the garment is a nylon jacket, the portion to be printed is placed in the heat press for less than about 10 seconds (preferably about 5 seconds) at a press temperature of 325°–400° F., to release any entrained moisture. The nylon shrinks slightly due to the heat. While the nylon is warm (i.e., while at least some shrinkage is present), the decal of FIG. 1 is placed with the adhesive face down onto the garment, so that the logo components 14 are right-reading as viewed through the carrier sheet 12. The hot platen of the press is closed, for less than about 10 seconds (preferably about 5 seconds) at a press temperature of about 325°–400° F. and a pressure of 2–10 psi bearing on the decal. The press is opened and the affected area is left to cool naturally. The adhesion of the ink patterns to the garment is sufficient to permit manual peeling of the carrier sheet 12 without lifting off, or in any way adversely affecting, the ink pattern. A final heat set of the graphic is then performed, as will be described below.

Whereas in the prior techniques developed by the inventor, the degree to which the affected area was left to cool after the initial adhesion, would be determined to some extent by the size of the graphic, with the present invention, the peeling of the carrier sheet can be performed essentially immediately, while the area is still hot. Thus, the present invention affords a significant improvement in throughput in a high production environment, where an operator may be expected to continuously attach decals for customers. As described above with respect to FIG. 3, the coating **12*b*, changes properties as its temperature rises above 200° F., such that when the decal is pressed against the fabric with a platen temperature in the range of 325°–400° F., the upper surface of the carrier disadheres from the ink. "Disadhesion" in this context, means that the degree of cohesion between the upper surface 12*a* and the graphic 20,22**, diminishes to the extent that there is little or no resistance to sliding movement of the graphic relative to the upper surface.

This is a significant advantage when the decal has been applied to a nylon substrate. Nylon shrinks when heated, then returns to its original shape upon cooling. The steps of preshrinking the nylon and initially adhering the graphic to the nylon, by heating under the platen, effect bonding of the graphic to the nylon, while the nylon is in a somewhat shrunken state. The bonding of the graphic to the nylon is, however, tenuous, and therefore the carrier must not be peeled away from the graphic until the adhesion between the carrier and the graphic is lower than the adhesion between the graphic and the fabric. With uncoated or conventional release coating of the carrier base, the adhesion between the carrier and the graphic is relatively high at elevated temperature, and reduces with a reduction in temperature. As the operator waits for the temperature at the carrier surface and thus the adhesion between the carrier and graphic to reduce sufficiently such that peeling away of the carrier will not remove the graphic from the fabric, the nylon is also cooling and expanding. During this period, the side of the graphic adhering to the fabric follows the expansion of the nylon, whereas the other side of the graphic adhering to the carrier, remains relatively fixed. Especially with large graphics, this can cause the corners of the graphic to lose adhesion from the fabric, such that the edges of the graphic will not be bonded to the fabric when the process is completed.

With the carrier of the present invention, the adhesion between the surface of the carrier and the graphic decreases with increasing temperature, such that the carrier can be easily peeled from the graphic immediately upon opening of the platen, before the temperature of the fabric has changed significantly. Moreover, the disadhesion of the graphic relative to the carrier surface with the present invention is so effective, that the carrier has in some instances been observed to lift off the graphic as the platen is opened. Once the carrier has been peeled from the graphic, the graphic can easily remain adhered to the fabric even if the fabric continues to cool indefinitely.

As a result, the final, heat-setting step can be performed immediately, or if for some reason the operator's attention is diverted, the heat setting step could be deferred indefinitely. The inks are heat set into the fabric upon a reheat for more than about 20 seconds (preferably 30 seconds) at press temperature of 325°–400° via a heating pad interposed between the ink and the heat press. The pad is preferably a silicone rubber sponge with a surface texturing that can be either smooth or textured if such texturing is desired in the graphic. The pad is preferably 0.030–0.040 inches thick, with a relatively soft, flexible characteristic, e.g., about 30–50 (preferably 40) durometer.

This pad serves three important functions. First it provides a non-stick, semi-insulated buffer between the heated platen of the heat press and the ink on the fabric, so that the 375° preferred temperature of the press is felt as a lesser temperature by the ink, or even if the temperature of the ink reaches the temperature of the heated platen, the duration at the peak temperature is less than the duration for which the press was closed. Secondly, the pad provides a texturing of the surface of the ink which will be visible in the finished product. Thirdly, and quite importantly when the fabric is woven nylon, the pad permits lateral sliding of the heated surface of the ink during the heat setting operation, as the nylon differentially shrinks relative to the ink. This sliding reduces the stress gradient through the ink during the heat setting step and the residual stresses after cooling. The stress reduction prevents curling or detachment of the edges of the ink graphic, especially in wider graphic patterns. For this reason, the pad preferably has an anti-friction agent, such as silicone in the preferred silicone rubber embodiment.

I claim:

1. An ink transfer decal comprising:

a carrier sheet having a dimensionally stable base and a coating on the base defining an upper surface of the carrier sheet, wherein the coating comprises an acrylic copolymer cross linked with polymeric diphenol methane diisocyanate and silica particulates, whereby said upper surface has a non-tacky, smooth matte finish at ambient temperature;

a film of dried thermoplastic ink having at least one color, printed directly on and adhering at ambient temperature to the upper surface of the carrier sheet to form a reverse image graphic;

a deposit of thermoplastic adhesive covering the ink;

thereby constituting an ink decal for transferring the reverse image graphic from the carrier sheet to a substrate at elevated temperature.

2. The decal of claim 1, wherein the silica particulates in the coating, have a maximum concentration at said upper surface.

3. The decal of claim 1, wherein the acrylic copolymer includes ethyl acetate, and hexane.

4. The decal of claim 3, wherein the polymeric diphenol methane diisocyanate has a weight fraction in the coating, of between about one to three percent of the weight of the acrylic copolymer including ethyl acetate and hexane.

5. The decal of claim 1, wherein the ink deposit is urethane based, and has a thickness of at least about 0.5 mil.

6. The decal of claim 5, wherein the adhesive is urethane based.

7. The decal of claim 1, wherein the base of the carrier, is a polyester film.

8. An ink transfer decal comprising:

a carrier sheet having a dimensionally stable base and a coating on the base defining an upper surface of the carrier sheet, said upper surface having a non-tacky, smooth matte finish at ambient temperature;

a film of dried thermoplastic ink having at least one color, printed directly on said upper surface to form a reverse image graphic and adhering to the upper surface of the carrier sheet with a degree of adhesion that varies with temperature, such that at a temperature between about 250° F. to 350° F. said upper surface disadheres from the film of dried ink;

a deposit of thermoplastic adhesive covering the ink;

thereby constituting an ink decal for transferring the reverse image graphic to a substrate at a temperature in the range of about 250° F. to 350° F.

9. An ink transfer decal comprising:

a carrier sheet having a dimensionally stable base and a coating on the base defining an upper surface of the carrier sheet, said upper surface having a non-tacky, smooth matte finish at ambient temperature;

a film of dried thermoplastic ink having at least one color, printed directly on and adhering to the upper surface of the carrier sheet to form a reverse image graphic;

a deposit of thermoplastic adhesive covering the ink;

wherein said coating exhibits a high degree of adhesion to the ink graphic at ambient temperature with a transition to a very low degree of adhesion at elevated temperature; thereby constituting an ink decal for transferring the reverse image graphic to a substrate.

* * * * *